March 17, 1925.  1,530,245

R. DIETZE

ELECTROMAGNETIC ENERGY DIRECTION AND POWER FACTOR INDICATOR

Filed Sept. 5, 1922

Inventor:
Richard Dietze,
by *Allen G. Davis*
His Attorney.

Patented Mar. 17, 1925.

1,530,245

UNITED STATES PATENT OFFICE.

RICHARD DIETZE, OF PANKOW, GERMANY, ASSIGNOR TO GENERAL ELECTRIC COMPANY, A CORPORATION OF NEW YORK.

ELECTROMAGNETIC ENERGY-DIRECTION AND POWER-FACTOR INDICATOR.

Application filed September 5, 1922. Serial No. 586,092.

*To all whom it may concern:*

Be it known that I, RICHARD DIETZE, a citizen of Germany, residing at Pankow, Germany, have invented certain new and useful Improvements in Electromagnetic Energy-Direction and Power-Factor Indicators, of which the following is a specification.

My invention relates to electric instruments of the indicating type and particularly to alternating current indicating instruments.

The electro-magnetic energy-direction indicators heretofore built are limited, in their application, to direct current, since the instrument in all cases is built as a polarized instrument with permanent magnets. For this reason it has heretofore been possible to build an energy-direction indicator only for direct current, while such an instrument for alternating current is unknown. Only instruments on the wattmeter principle have heretofore been employed as wattless-current indicators.

The instrument of my invention is based on a novel principle and can be used indifferently for direct current and for alternating current.

Figure 1:
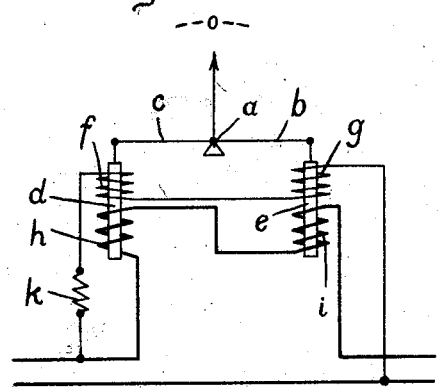
Figure 3:
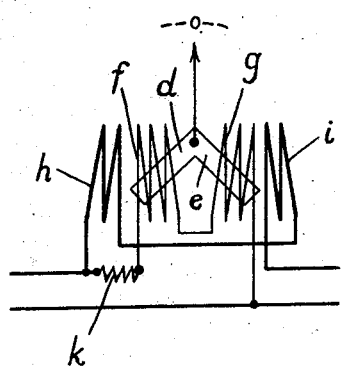
Figure 4:
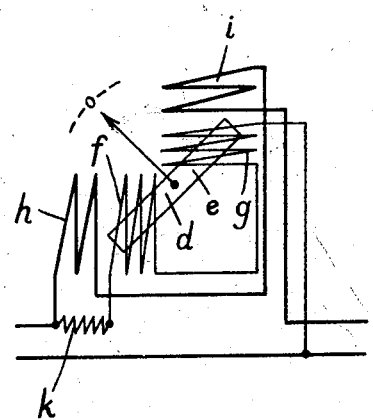

The features of my invention which I believe to be novel and patentable will be pointed out in the claims appended hereto. The construction and theory of operation of the instrument will be described in connection with the accompanying drawings, in which, Figs. 1, 3 and 4 show three different forms of construction and Fig. 2 shows a vector diagram illustrative of the principle of operation involved.

The new instrument is based on the idea of causing torques in opposite directions on a pointer by means of two lever arms and iron cores attached thereto through two pairs of current and voltage coils, which torques cause the deflection of the pointer to one side for one direction of current and to the other side on reversal of the direction of current.

The three illustrative constructions shown in the drawing show different arrangements of the coils and of the iron cores. According to Fig. 1, the above-mentioned oppositely acting torques are produced on the lever which is rotatably mounted at $a$ and provided with the arms $b$ and $c$, by means of the iron cores $d$ and $e$ through the co-operation of voltage coils $f$ and $g$, as well as of current coils $h$ and $i$. To this end, the current coils $h$ and $i$ are, for example, connected in the main line so as to produce fluxes in the same direction, while the voltage coils $f$ and $g$ are connected so as to produce fluxes in the opposite direction in their respective cores. Likewise the current coils may be connected in the opposite direction and the voltage coils in the same direction. The ohmic resistance $k$ shown in the drawings has for its object to bring the current in the windings $f$ and $g$ as nearly as possible into phase with the voltage. The instrument described shows therefore a zero deflection when the torques are equal and opposite in direction, while, when one or the other torques preponderate, as will occur by reason of the energy flowing in one direction or the other, the pointer is deflected to the right or left, and thereby indicates whether, for example, a certain apparatus, such as a dynamo, is drawing energy from the lines or is furnishing energy thereto.

Figure 2:
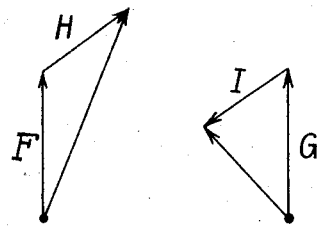

In Fig. 2 is shown, by a vector diagram, the method of operation of the instrument for an alternating current circuit, in which a certain phase displacement exists between current and voltage. The size of the vectors shown corresponds to the ampere turns of the effective windings. The torque on the left-hand side is produced by the vectorial sum of the ampere turns F of the voltage winding $f$ and the ampere turns H of the current winding $h$, while the torque on the right-hand side is produced by the vectorial difference of ampere turns G in winding $g$ and the ampere turns I in winding $i$. If the torque is greater on the left-hand side than on the right-hand side, the instrument needle is deflected to the left; if the torque is the same the needle will return to zero, while, as the torque becomes greater on the right-hand side, it is deflected to the right, and indicates the direction of current or the direction of flow of the energy which is caused by the relation of the existing currents to the voltages which produce them or which are present in the circuit.

The phase displacement has an influence on the sensitiveness of the instrument. The torques acting on the movable system are greatest with direct current and with alternating current when the power factor is equal to 1, and are smallest when the power factor is equal to zero. If now, by suitable variation of the reactance in the circuit of the windings $f$ and $g$, a phase displacement of 90° is established between the current flowing in these windings and the voltage, or if, in polyphase circuits, the junction is so made that there is a 90-degree phase displacement between the currents in the current and voltage windings, then, for a power factor equal to zero the sensitiveness will be greatest, while with the power factor equal to 1 the pointer will return to zero. When there is wattless current therefore, the pointer will be deflected in one or the other direction according to whether the phase displacement is capacitive or inductive.

In Fig. 3 is shown an arrangement of the instrument in which all the coils, the current coils $h$ and $i$ as well as the voltage coils $f$ and $g$ are co-axially arranged. The iron cores $d$ and $e$ co-operating with the coils $h, i, f, g$ are arranged, according to Fig. 3, in the form of an angle-iron (nearly rectangular), which is rotatably mounted at a point outside the axis of the coils and is connected with the pointer.

An arrangement by which the lever arms according to Fig. 3 are arranged rectilinearly to each other is shown in Fig. 4. Here the axis of the current coil $h$ and the voltage coil $f$ is perpendicular to the axis of the current coil $i$ and the voltage coil $g$. Otherwise, the connections are the same as in Figs. 1 and 3; the point of rotation of the lever formed by the iron cores $d$ and $e$ lies, according to Fig. 4, within the angle formed by the two axes of the coils.

The instrument may thus be used with either direct or alternating current to indicate the direction of energy flow or in an alternating current circuit and with the proper phase displacement between the currents flowing in the current and voltage coils to indicate leading, lagging and unity power factors.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. An electromagnetic instrument comprising a pair of opposing electromagnet systems, each system having a voltage and current coil, said voltage coils being connected in series and said current coils being connected in series, the relative coil connections in the two systems being reversed and means for causing the current and voltage in said voltage coils to be approximately in phase with each other.

2. In combination an electric supply circuit, an instrument having a pair of current coils connected in series with said circuit and a pair of voltage coils connected in series with a non-inductive resistance across said circuit, a magnetic core jointly acted upon by one of said current and one of said voltage coils, a magnetic core opposingly acted upon by the other current and voltage coils and an indicating pointer acted upon by the opposing action of said cores.

3. An electromagnetic instrument comprising an indicator and two counterbalanced solenoids with movable cores tending to move said indicator, said solenoids each having a voltage coil and a current coil thereon, the voltage coils being connected in series and the current coils being connected in series, said coils being arranged so that the electromagnetic pull on one solenoid is proportional to the vector sum of the fluxes produced by its coils when the pull of the other solenoid is proportional to the vector difference of the fluxes produced by its coils.

4. An alternating current instrument having a pair of opposed electromagnet systems, each system having a current and voltage coil, the current coils and the voltage coils of the systems being respectively connected in series and wound so that when the current and voltage currents flowing through the coils are in phase, the fluxes produced by the coils of one electromagnet system act in opposition and the fluxes produced by the coils of the other electromagnet system act together, and when the current and voltage currents flowing through the coils are 90 degrees out of phase, the two electromagnetic systems are balanced.

In witness whereof I have hereunto set my hand this 27th day of July, 1922.

RICHARD DIETZE.